(12) United States Patent
Schiller et al.

(10) Patent No.: US 7,295,700 B2
(45) Date of Patent: Nov. 13, 2007

(54) OBJECT EXTRACTION BASED ON COLOR AND VISUAL TEXTURE

(75) Inventors: Stephen N. Schiller, Berkeley, CA (US); Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 649 days.

(21) Appl. No.: 10/693,295

(22) Filed: Oct. 24, 2003

(65) Prior Publication Data

US 2005/0089216 A1    Apr. 28, 2005

(51) Int. Cl.
G06K 9/62 (2006.01)
(52) U.S. Cl. .................. 382/159; 382/164; 706/20
(58) Field of Classification Search ............... 382/159, 382/162, 164, 156, 199; 706/20
See application file for complete search history.

(56) References Cited

U.S. PATENT DOCUMENTS

| | | | | |
|---|---|---|---|---|
| 5,724,487 | A * | 3/1998 | Streit | 706/25 |
| 5,912,994 | A * | 6/1999 | Norton et al. | 382/283 |
| 6,026,182 | A * | 2/2000 | Lee et al. | 382/173 |
| 6,381,363 | B1 * | 4/2002 | Murching et al. | 382/164 |
| 6,504,951 | B1 * | 1/2003 | Luo et al. | 382/165 |
| 6,606,408 | B1 * | 8/2003 | Kang et al. | 382/164 |
| 6,778,701 | B1 * | 8/2004 | Okajima | 382/190 |
| 7,062,085 | B2 * | 6/2006 | Luo et al. | 382/165 |
| 2002/0102017 | A1 * | 8/2002 | Kim et al. | 382/164 |
| 2003/0007683 | A1 * | 1/2003 | Wang et al. | 382/159 |
| 2003/0063797 | A1 * | 4/2003 | Mao | 382/162 |
| 2004/0170337 | A1 * | 9/2004 | Simon et al. | 382/254 |

OTHER PUBLICATIONS

Boskovitz et al, "An Adaptive Neuro-Fuzzy System for Automatic Image Segmentation and Edge Detection", IEEE Transactions on Fuzzy Systems, vol. 10, No. 2, Apr. 2002, pp. 247-261.*
Littmann et al, "Adaptive Color Segmentation—A Comparison of Neural and Statistical Methods", IEEE Transactions on Neural Networks, vol. 8, No. 1, Jan. 1997, pp. 175-185.*
Littmann et al, "Adaptive Color Segmentation—A Comparison of Neural and Statistical Methods", IEEE Transactions on Neural Networks, vol. 8, No. 1, Jan. 1997, pp. 1.*
Tan et al, "Selecting Objects With Freehand Sketches", In Proceedings IEEE International Conference on Computer Vision 2001.*

* cited by examiner

*Primary Examiner*—Joseph Mancuso
*Assistant Examiner*—Andrae Allison
(74) *Attorney, Agent, or Firm*—Fish & Richardson P.C.

(57) ABSTRACT

Method and apparatus for segmenting a first region and a second region. A method for defining a boundary separating a first region and a second region of a digital image includes determining using a learning machine, based on one or more of the color arrangements, which pixels of the image satisfy criteria for classification as associated with the first region and which pixels of the image satisfy criteria for classification as associated with the second region. The digital image includes one or more color arrangements characteristic of the first region and one or more color arrangements characteristic of the second region. The method includes identifying pixels of the image that are determined not to satisfy the criteria for classification as being associated either with the first region or the second region. The method includes decontaminating the identified pixels to define a boundary between the first and second regions.

27 Claims, 13 Drawing Sheets

OBJECT EXTRACTION BASED ON COLOR AND VISUAL TEXTURE

BACKGROUND

The present invention relates to digital image compositing.

A digital image can include one or more regions. A region of the digital image, as used in this specification, refers to a group of pixels whose association can be arbitrary or otherwise. Pixels can be grouped, for example, such that the region they define represents a real world material such as hair, grass, sky, or wood. A region can represent one or more real world materials and different regions can represent different real world materials. A region can but need not be contiguous and may be made up of two or more non-contiguous parts. A region can include pixels that are associated with other regions.

A region representing a real world material usually does not consist of only one color. Rather, the region typically includes multiple colors, spatially arranged in a manner that represents the appearance of the material. For example, a region that represents grass can include various shades of green and perhaps other colors as well. A region of foliage can include various shades of green and brown. A spatial arrangement of colors over one or more pixels is referred to in this specification as a color arrangement. A color arrangement that can characterize an appearance of a material will be referred to in this specification as visual texture.

In a computer application for editing digital images, for example, Adobe® Photoshop® available from Adobe Systems of San Jose, Calif., it can be quite useful to be able to select a region that corresponds to a single real world material and modify the selected region in isolation of the surrounding pixels or regions. Having this capability, for example, would allow one to change the color only of the hair of a person being portrayed in a digital image, while maintaining the same color or colors of pixels surrounding the hair. The selection and isolation of a region that represents a real world material or object is referred to in this specification as object extraction. Object extraction from a digital image typically includes segmentation of the image into regions, each of which represents a single real world material. Segmentation usually includes locating a boundary between two regions. Segmentation usually includes determining which pixel belongs to which region.

SUMMARY

The present invention relates to methods and apparatus, including computer-program products, for object extraction based on color and visual texture.

In general, in one aspect, the invention provides a method for defining a boundary separating a first region and a second region of a digital image, the digital image including one or more color arrangements characteristic of the first region and one or more color arrangements characteristic of the second region. The method includes determining using a learning machine, based on one or more of the color arrangements, which pixels of the image satisfy criteria for classification as associated with the first region. The method includes determining using a learning machine, based on one or more of the color arrangements, which pixels of the image satisfy criteria for classification as associated with the second region. The method includes identifying pixels of the image that are determined not to satisfy the criteria for classification as being associated either with the first region or the second region. The method includes decontaminating the identified pixels to define a boundary between the first and second regions.

In general, in another aspect, the invention provides a method for defining a boundary separating a first region and a second region of a digital image. The method includes determining based on an output of a neural network which pixels of the image satisfy criteria for classification as associated with the first region. The method includes determining based on an output of the neural network which pixels of the image satisfy criteria for classification as associated with the second region, wherein the neural network includes a gating node associated with a corresponding hidden node, the gating node being configured to determine, based on a location of a pixel being considered, a contribution the corresponding hidden node makes to an output of the neural network.

In general, in another aspect, the invention provides a computer program product, tangibly stored on machine readable medium, for segmenting a first region and a second region, each region including one or more color arrangements that are characteristic of the region. The product includes instructions operable to cause a processor to determine based on one or more of the color arrangements which pixels of the image satisfy criteria for classification as associated with the first region. The product includes instruction to determine based on one or more of the color arrangements which pixels of the image satisfy criteria for classification as associated with the second region. The product includes instructions to identify pixels of the image that are determined not to satisfy the criteria for classification as being located either in the first region or the second region. The product includes instructions to decontaminate the identified pixels to define the boundary.

In general, in another aspect, the invention provides a computer program product, tangibly stored on machine readable medium, for segmenting a first region and a second region, each region including one or more color arrangements that are characteristic of the region. The product includes instructions operable to cause a processor to receive an input that selects a portion of the first region and an input that selects a portion of the second region. The product includes instructions to identify pixels, based on the inputs and the color arrangements of the first and second regions, located in the first region. The product includes instructions to identify pixels, based on the inputs and the color arrangements of the first and second regions, located in the second region.

A system in accordance with the invention defines a boundary between regions based on certain parameters. These parameters can include color, but need not rely solely on color differences to locate the boundary between a first region and a second region, each of which includes similar colors. Consequently, the system of the invention advantageously can locate the boundary even when colors included in the two regions are similar. The system also need not rely solely on edge detection techniques to locate the boundary. The system is efficient in that it does not require a user to manually determine which pixels belong to which region on a pixel-by-pixel basis. The system can consistently extract an object in accordance with user input. The system, for example, can segment a digital image into two or more regions as specified by a user and, consequently, extract the appropriate object or objects.

A learning machine in accordance with the invention can discriminate different color arrangements and different visual textures. A learning machine of the neural-network type can determine which of its hidden nodes contribute to the determination of its output. Training for such a system can be accomplished in a combined training session using both color and texture. There is no need to separately train the learning machine to determine which hidden cells contribute to the determination of its output.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
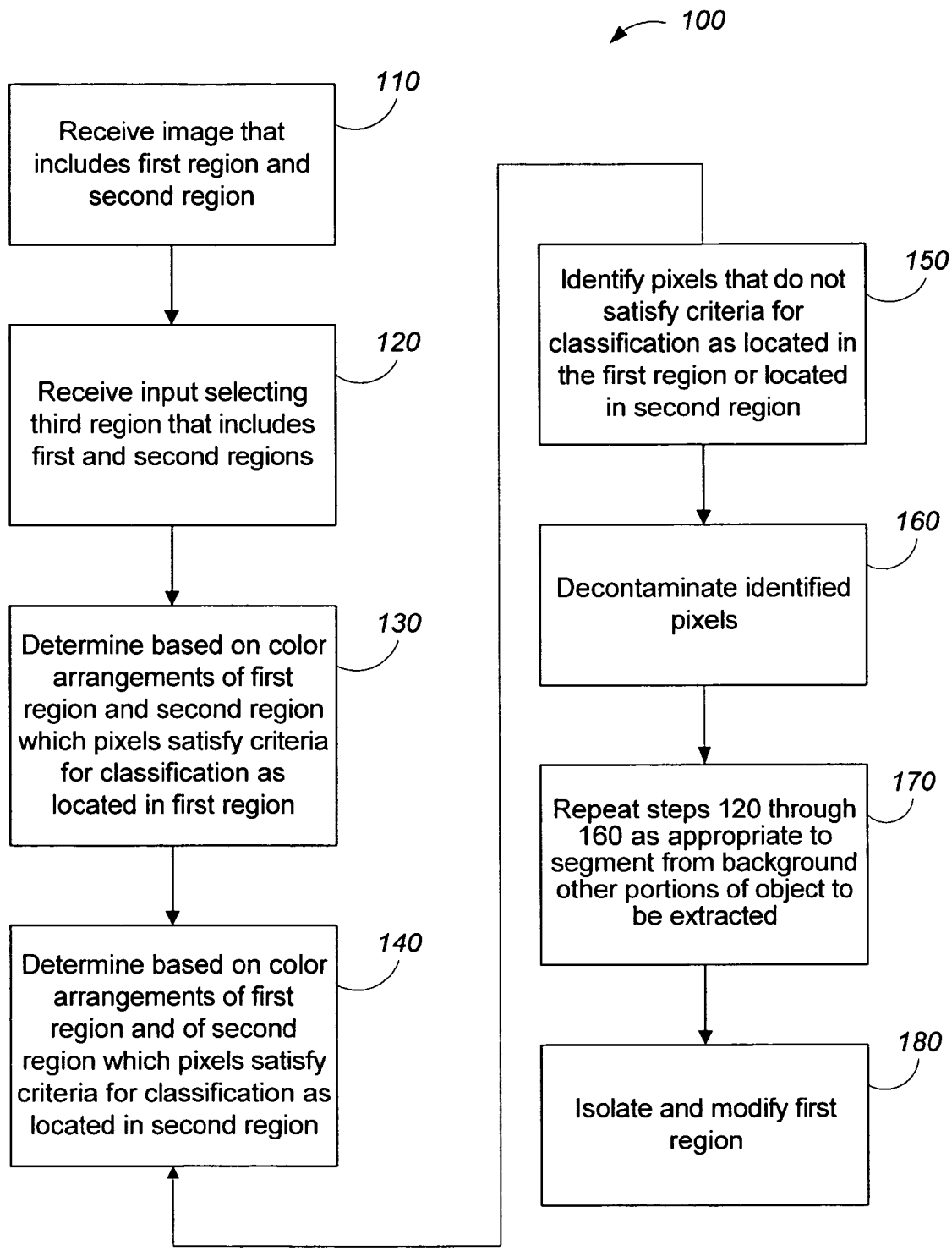
FIG. 1 shows a method 100 for locating a boundary between two regions of a digital image.

FIG. 1 shows a method 100 for locating a boundary between two regions of a digital image. As shown, a system performing method 100 receives a digital image that includes a first region and a second region (step 110). The first region exhibits one or more color arrangements that are characteristic of a first visual texture. For example, the first region can represent a first real world material. The second region exhibits one or more color arrangements that are characteristic of a second visual texture. The second region can represent a second real world material. The digital image can include additional regions, for example, those that exhibit color arrangements that are characteristic of other visual textures.

We will call the first region a "region of interest". For example, the region can represent at least a portion of an object that a user would like to extract from the digital image. In this specification, one region of interest is referred to as a foreground and a second region that is not of interest is referred to as a background.

The system receives an input, such as an input from a user, selecting a third region of the digital image (step 120). The third region is a portion of the digital image. Alternatively, the third region is the entire digital image. The third region is the group of pixels being segmented into the first region and the second region. It is among pixels of this third region through which a boundary is to be located. The third region includes at least a portion of the first region and at least a portion of the second region. Selection of the third region can be made to include only color arrangements characteristic of only two visual textures. This type of selection can facilitate the boundary location process.

The system determines, based on the one or more color arrangements of each of the first and second regions, which pixels in the third region satisfy criteria for classification as located in the first region (step 130). The determination can be based on the color arrangements of the first and second regions, a location of the pixel under consideration, or both the color arrangements and the location of the pixel under consideration. To perform the determination, the system typically needs user input that specify an approximate location of the boundary. The user input further needs to specify on which side of the boundary the first region is located. In one implementation, the approximate location of the boundary can be specified by a brush stroke that is 40 pixels wide. Instead of specifying an approximate location of the boundary, the user input can provide samples of color arrangements of the first and second regions. In one implementation, the samples can be specified by a user selection of pixels that have a high probability of being located in the first region (for example, pixels located near the center of the first region) and pixels that have a high probability of being located in the second region (for example, pixels located near the center of the second region).

The system can include a learning machine that can perform the determination of step 130. In general, a learning machine can receive input patterns and provides an output that classify the patterns into N classes, N being 2 or greater. The input patterns can be drawn from various domains, for example, one for describing color arrangements, and are usually coded as lists of numbers. The lists are referred to in this specification as input vectors. The output of the learning machine can be a single number that specifies the class to which an input pattern most likely belongs. Alternatively, the output can be N numbers, one for each class. In this case, each number specifies a probability that the input pattern belongs to the corresponding class. In an implementation where there are two classes and membership in one class is exclusive to membership of the other class, the output can be a first number that indicates a probability of membership in one class and the probability of membership in the other class is calculated as 1 minus the first number.

An input pattern representing a color arrangement is typically derived from a set of pixels exhibiting the color arrangement. Pixels of this set are usually located near each other. The set of pixels from which an input pattern is derived will be referred to in this specification as a learning-machine input set. Note that a learning-machine input set can include only one pixel and, furthermore, need not be contiguous. Furthermore, a learning-machine input set may and probably does include pixels that belong to other learning-machine input sets. That is, learning-machine input sets may overlap.

In one implementation, the learning machine classifies a pixel of interest as being located in the first or second region based on the color arrangement exhibited by the pixel of interest and its neighboring pixels. Neighboring pixels are those located next to or near the pixel of interest. The learning-machine input set, in this case, is th pixel of interest an its neighboring pixels (collectively referred to in this specification as a neighborhood of pixels). A neighborhood of pixels can be, for example, a three-by-three square of pixels, a five-by-five square of pixels, or a seven-by-seven square of pixels. The neighborhood need not necessarily be a square. The pixel of interest is usually, but need not be the center pixel. Alternatively, the neighborhoods of pixels set can include other arrangements o pixels that exhibits a color arrangement that is characteristic of the first or the second region.

A common feature of learning machines is that they are trained on a set of sample input patterns derived from a training set of pixels, referred to in this specification as a training set, before they are used to classify patterns. The training set usually exhibits sample patterns from each of the N classes. The training set, for example, includes pixels that are known to be located in the first region and pixels that are known to be located in the second region. Usually, the training set includes a portion of the first region and a portion of the second region. The training set usually includes multiple learning-machine input sets. During training, the learning machine can make internal adjustments to one or more classification functions, F1, F2, . . . Fn, so as to correctly classify, as much as possible, the input patterns of the training set. After being trained, the learning machine is usually able to generalize from the training set to correctly classify new input patterns not exhibited by the training set. The user input described above with respect to step 130 can be used to specify the training set.

In one implementation, each of the classification functions, F1, F2, . . . Fn, takes as input a vector describing a pattern and provide as output a single number indicating the category to which the input pattern belongs. Each classification function includes internal parameters that determine how the function computes its output. The learning machine includes a procedure for adjusting the internal parameters of the classification function based on a training set. A training set can include an input pattern and the desired output from each of the classification functions, F1, F2, . . . Fn.

The learning machine can be a support vector machine ("SVM"), which can be trained to categorize input patterns into two classes, for example, a first class and a second class. Input patterns of the SVM can be specified by lists of numbers. The lists are of the same length, i.e., including the same quantity of numbers. The lists can be input vectors.

The principle behind an SVM is that input vectors are to be mapped into feature vectors. A feature vector also can be a list of numbers, like an input vector, but the numbers in the feature vector correspond to measurements of certain features of the input vectors. A feature vector number, for example, can correspond to properties of color channel values of input pixels. For example, for a three-by-three arrangement of pixels where each pixel has three color channels (e.g., (r, g, b)), the input vector used to specify the three-by-three arrangement would need three numbers for each of the input pixels, or twenty-seven numbers. The system can compute from such an input vector the following: the mean color of the arrangement; the variance of the colors within the arrangement; the amount of high-frequency variation in a channel (i.e., the red, green, or blue component); the amount of low-frequency variation in a channel (i.e., the red, green, or blue component); and the largest group of elements with substantially the same color. The described list is not exhaustive and the system can perform other computations. Note that each feature is computed from some number of the elements in the input vector.

The mentioned feature vector can be thought of as points in an n-dimensional space, where n is the number of features. The n-dimensional space is called feature space. If the features are chosen well, there should exist a hyperplane in feature space that separates elements of the first class from those of the second class. All elements of the first class lie on one side of the hyperplane and all elements of the second class lie on the other side. The training of an SVM can include a process for finding the hyperplane.

There can be an optimal hyperplane that can be positioned so that it is maximally far from all elements of the input vectors used to trained the SVM. Because a training set may be imperfect, there may not actually be a hyperplane that separates the two training classes. In this case, there can be an error budget, where some input vectors of the training set are allowed to be on the wrong side of the hyperplane as long as the sum of the magnitudes of these errors from these vectors is at or below the error budget. The magnitude of an error for a vector is 0 if the input vector is on the correct side of the hyperplane and, for example, can be the distance to the hyperplane if it is on the wrong side. As discussed above, the training set of input vectors that is used to train the SVM can be specified by the user input described above with respect to step 130.

Instead of being an SVM, the learning machine can be a neural network, for example, a classification neural network. In general, a neural network includes one or more functions that takes many inputs, for example, one hundred inputs, and produces only a few outputs, for example, one output. An input can include information specifying a particular color arrangement and a particular location of the color arrangement. The color arrangement is exhibited by a learning-machine input set of pixels. An output can be a floating point number that indicates the region with which the pixel being considered is associated. The floating point number indicates a probability that the pixel is associated with the region.

The neural network can include a large number of associated parameters that determine its output for various inputs. The neural network can be trained, for example, by adjusting the parameters to give a more correct output for a training set of inputs. As with training sets of other learning machines, a training set for a neural network can be specified by the user input described above with respect to step 130. Training is usually an iterative process in which the parameters converge so that the neural network yields correct outputs for the training inputs. After it is trained, the neural network is usually expected to generalize and yield correct results for inputs outside of the training set. One implementation of a neural network is described below in reference to FIG. 3.

Criteria for classification of a pixel as located in a region can include a condition that the learning machine has determined that the pixel exceeds a particular threshold probability of being located in that region. Alternatively, the criteria can include other conditions.

The system determines, based on the one or more color arrangements of the first and second regions which pixels in the third region satisfy criteria for classification as located in the second region (step 140 of FIG. 1). The determination made in this step can also be made by the learning machine and is similar to the determination described for step 130. The learning machine can be configured to determine, for each pixel in the third region, the probability that the pixel belongs to the second region. As with step 130, the system typically needs user input to perform the determination of step 140. The user input can specify either an approximate location of the boundary or, alternatively, provide samples of color arrangements of the first and second regions.

Criteria for classification as located in the second region can include a condition that the learning machine has determined that a pixel exceeds a particular threshold probability of being located in the second region. Alternatively, the criteria can include other conditions.

As indicated above, each of the determination steps 130 and 140 can include a training session during which the learning machine is trained. Alternatively, there can be one training session during which the learning machine is trained to perform the determinations of steps 130 and 140.

The determining steps 130 and 140 can be combined as one determining step. In this case, the learning machine can provide as output a floating point number between a first number and a second number, inclusive, for each pixel of interest (for example, a pixel being considered). The first floating point number indicates a one-hundred percent probability of the pixel being located in the second region and a zero percent probability of the pixel being located in the first region. The second number indicates a one-hundred percent probability of the pixel being located in the first region and a zero percent probability of the pixel being located in the second region. Values between the first and second numbers can be interpolated to indicate probability values between one-hundred percent and zero percent.

The system identifies pixels in the third region that neither satisfy criteria for classification as located in the first region nor satisfy criteria for classification as located in the second region (step 150). That is, the system identifies pixels that do not satisfy criteria for classification as located in the first region or located in the second region. The system can identify these pixels by using a mask, for example, an opacity mask. In general, a mask is an image having the same lateral extent as the image under consideration, for example, the image received in step 10. The opacity value assigned to a pixel in the mask can determine the probability of a pixel being selected. With an opacity mask, i.e., an alpha channel mask, the system can assign opacity values to make pixels transparent that satisfy the criteria for classification as located in a particular region, and make opaque pixels that do not satisfy that criteria.

Optionally, the system can iterate through steps 110 through 150 to reduce the number of pixels that neither satisfy criteria for classification as located in the first region nor satisfy criteria for classification as located in the second region. For each iteration, the training set should be different from those used in previously iterations.

The system decontaminates pixels of the third region (step 160). In general, decontamination a set of pixels includes separating the set of pixels into three groups. The first group includes pixels that are located in a foreground. The second group includes pixels that are located in the background. The third group includes boundary pixels which are pixels located in a boundary between the foreground and the background regions. The system assigns to the foreground group pixels determined in step 130 to satisfy criteria for classification as located in the first region. The system assigns to the background group pixels determined in step 140 to satisfy criteria for classification as located in the second region. The system assigns to the boundary group pixels identified in step 150.

The decontamination process includes changing the color of one or more pixels of the boundary group based on the pixel's location relative to the first and second regions. The decontamination process can, for example, remove a background color from a boundary pixel when it has been determined that the boundary pixel is located in the foreground.

The decontamination process includes determining opacity values for one or more pixels of the boundary group based on the pixel's location relative to the first and second regions. A boundary pixel located near the first region, for example, would be assigned a greater opacity value than would a boundary pixel located far from the first region. Greater opacity values indicate greater degrees of opacity.

The decontamination process usually yields an image and an opacity mask. The image usually reflects color changes the decontamination process has made to the boundary pixels. The opacity mask usually includes the opacity values determined by the decontamination process. Each of the image and the opacity mask usually has the same lateral extent as the input set of pixels. One implementation of the decontamination process is described below in reference to FIG. 6.

The system can repeat steps 120 through 160 as appropriate to segment from the background other portions of the object to be extracted (step 170 of FIG. 1). Once the system has segmented from the background all portions of the object of interest, the system can combine them and extract the object. The system can combine the segmented portions based on the opacity masks produced by the decontamination.

The system can modify an object of interest in isolation of the background (step 180). The system can receive user input and modify the object accordingly. The system can, for example, change the color of the extracted object without changing the color of pixels surrounding the object. The system can cut and paste the object into another digital image. An application for editing digital images, for example, Adobe® Photoshop®, can convert an opacity mask to an image selection. The image selection is, for example, a list of pixels whose corresponding opacity value exceeds some threshold (for example, 127 in a range from 0 to 255). Once a selection is defined, the pixels in the selection can be moved to a new part of the digital image or into another digital image by translation of pixel coordinates and copying of pixel colors into the translated location.

Figure 2:
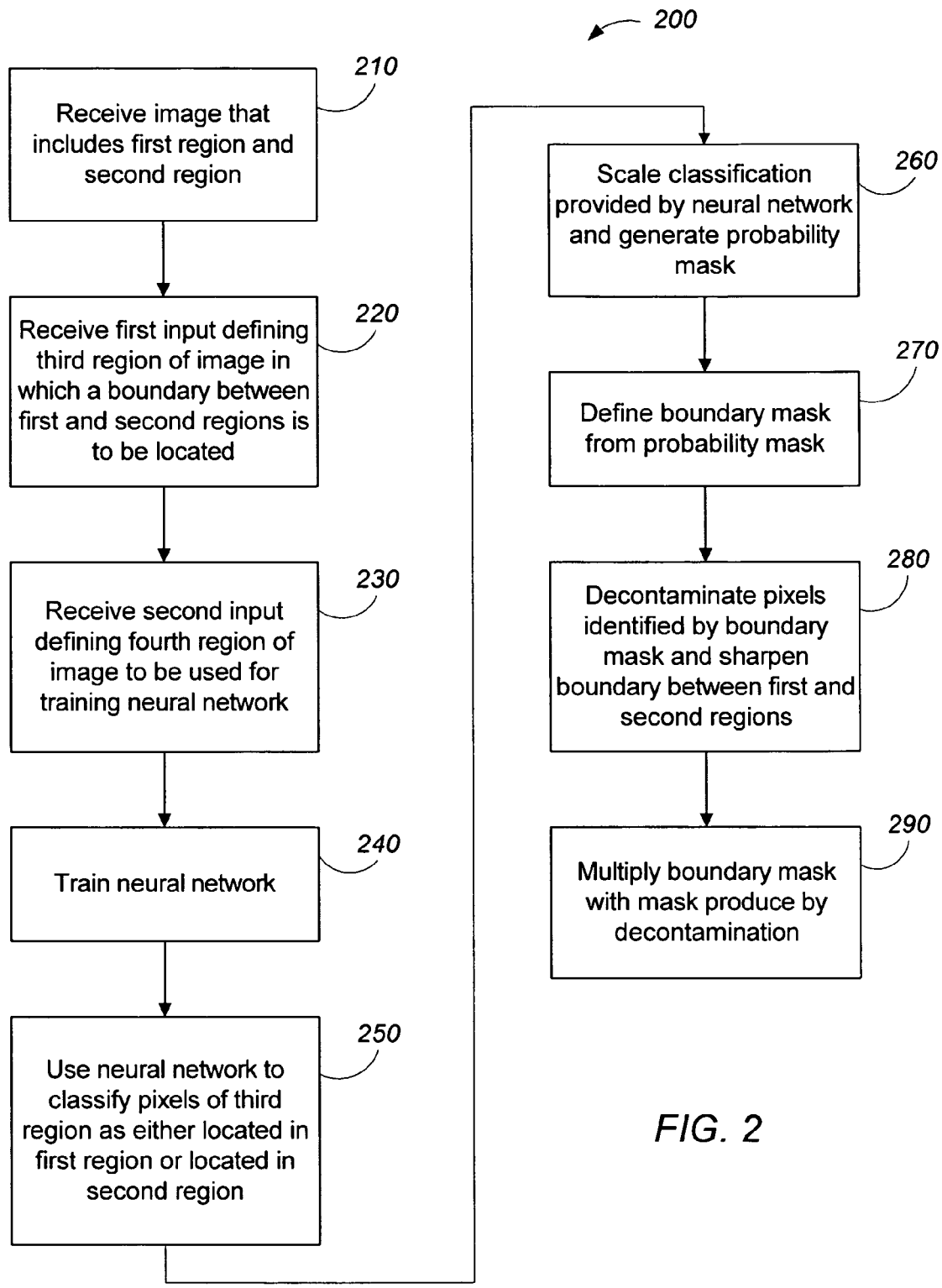
FIG. 2 shows a method 200 for extracting an object from a digital image.

FIG. 2 shows a method 200 for extracting an object of interest from a digital image. A system performing method 200 receives a digital image that includes a first region and a second region (Step 210). The system can include a computer application for editing digital images, for example, Adobe® Photoshop®. The first region can represent at least a portion of the object of interest. That is, the first region can include the foreground. The first region exhibits one or more color arrangements that are characteristic of a first visual texture. The first region can represent a first real world material. The second region exhibits one or more color arrangements that are characteristic of a second or additional visual textures also representing real world materials. Note that at this point, there is no input list specifying which pixels are located in the first region and which pixels are located in the second region. The digital image can include additional regions, for example, those that exhibit color arrangements that are characteristic of other visual textures.

The system receives a first input selecting a third region of the digital image (step 220). The first input can be a user input. The third region can be the group of pixels to be segmented. It is from among pixels of the third region that the boundary is to be located. The third region includes at least a portion of the first region and at least a portion of the second region. Selection of the third region can be made such that there are only color arrangements characteristic of only two visual textures. With such a selection, the system need compare the color arrangement characteristic of the first region, for example, a foreground region, against color arrangements characteristic of only one non-foreground visual texture. This type of selection can facilitate the boundary location process.

Segmentation and boundary location can involve the use of a neural network. The system can include a neural network configured to determine a probability that a pixel is located in the first region and a probability that the pixel is located in the second region. In one implementation, the neural network includes three or four layers, depending on whether there are gating nodes. When there are gating nodes, the neural network has four layers. The first layer includes input nodes. The second layer includes hidden nodes and gating nodes. The third layer includes multiplication nodes. The fourth layer includes an output node. When there are no gating nodes, the neural network has three layers. The first layer includes input nodes. The second layer includes hidden nodes, and the third layer includes an output node.

Input nodes of the neural network can receive input and convey input information to hidden nodes and, when they are present, gating nodes. A gating node is usually associated with a corresponding hidden node. The hidden nodes can discriminate the inputs and produce an output. The gating nodes can select a region from the third region, including the entire third region, over which the corresponding hidden node is active. The gating nodes can initially select the entire third region but can be trained to select smaller regions if doing so improves the accuracy of the neural network outputs. A gating node can determine, based on input location information, the contribution that a corresponding hidden node makes to an output of the neural network. The outputs of the hidden nodes can be sent to the output node.

The input to the neural network can include information specifying a color arrangement of a learning-machine input set of pixels. The color arrangement can be specified by one or more color values associated with the learning-machine input set of pixels. The one or more color values can be specified by an input vector. Input to the neural network can also include information specifying a corresponding location of a pixel being considered by the neural network. The location can be specified by any coordinate system, Cartesian or otherwise. The number of input nodes can be determined by the number of pixels included in the learning-machine input set. That is, the number of input nodes is usually based on the number of color values associated with the color channel of each pixel of the learning-machine input set.

Furthermore, the number of input nodes can be also based on the number of coordinates needed to specify the location of the pixel being considered. One example of a learning-machine input set of pixels is a three-by-three set of pixels, each of which includes three color channels (one for red intensity, one for green intensity, and one for blue intensity). Therefore, a total of nine input pixels are being considered. Each of the nine includes three color values. Thus, there should be a total of nine times three, or twenty seven input nodes for receiving the input color arrangement. Additionally, if the input coordinates need only two values to specify the location of the pixel being considered, then there should be two additional input nodes to receive input location information. In the example provided, the neural network would therefore include a total of twenty nine input nodes.

Figure 3:
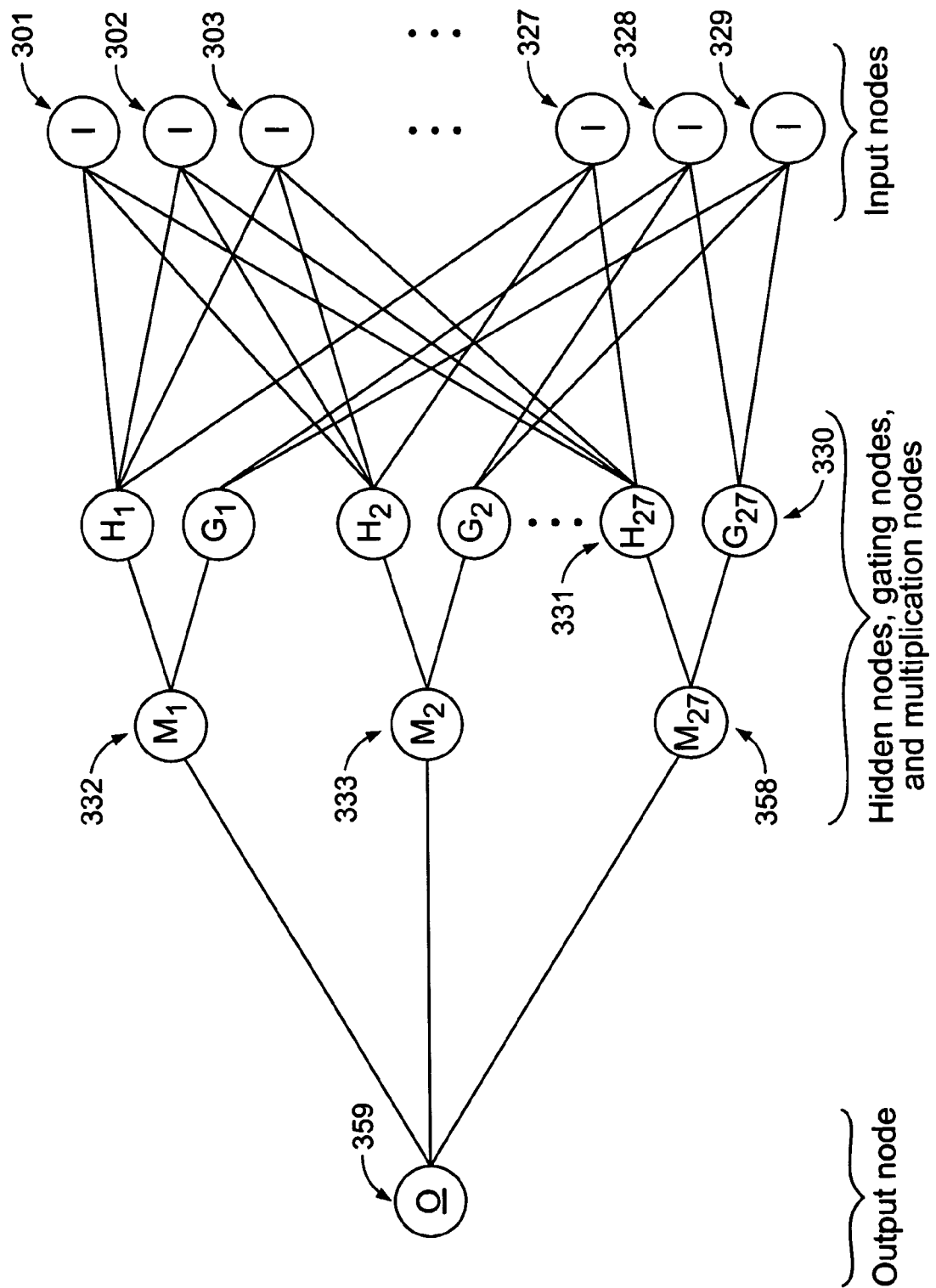
FIG. 3 shows an implementation of a learning machine of the neural-network type.

FIG. 3 shows one implementation of the neural network. The neural network is configured for receiving information for a three-by-three square of pixels. Each pixel has three color channels. The location of the pixel of interest can be specified by a two-parameter coordinate system. The network, thus includes twenty-seven input nodes 301-327 (configured to receive color arrangement information) and two input nodes 328 and 329 (configured to receive location information). Each of the hidden nodes is configured to receive input from the input nodes 301-327. Each gating node is configured to receive input from the input nodes 328 and 329. As discussed, gating nodes can select a region over which its corresponding hidden node is active.

For example, gating node 330 selects, based on input location information received from input nodes 328 and 329, regions over which hidden node 331 is active. The selection is effected by multiplication nodes 332-358 configured to receive input from the corresponding pair of gating and hidden nodes. The gating node 330, for example, can cause the multiplication node 358 to multiply the output of the hidden node 331 by a weighting factor that reduces the contribution that the output makes to the neural network determination.

The output node 359 is configured to receive the outputs from the multiplication nodes and to output a floating point number between a first number and a second number, for example, between −1 and 1.

The system receives a second input that specifies a training set (step 230 of FIG. 2). The second input can include a user selection. The input can specify a fourth region and a fifth region. The fourth region typically includes pixels that are known to be or that have a high probability of being located in the foreground. These pixels provide samples of color arrangements characteristic of the foreground. The fifth region typically includes pixels that are known to be or that have a high probability of being located in the background. These pixels provide samples of color arrangements characteristic of the background. Alternatively, the input can specify an approximate location of the boundary and, furthermore, which side of the boundary the foreground is located.

The system trains the neural network (step 240). The system uses the training set received in step 230 to train the neural network. The neural network responds by self-adjusting its parameters through backward propagation to produce correct outputs for the given training inputs.

Figure 4:
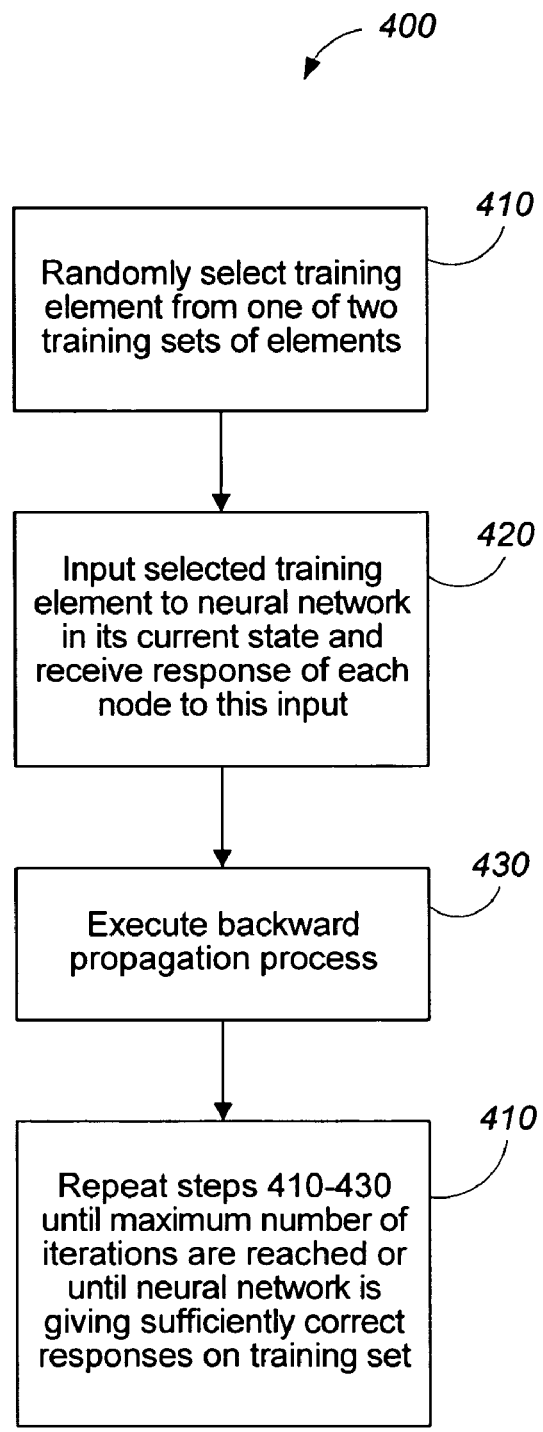
FIG. 4 shows a method 400 for training neural networks.

The following describes one training method 400 that uses backward propagation. As shown in FIG. 4, a system performing training method 400 randomly selects a training element from one of the two training sets of elements (step 410). The system inputs the selected training element to the neural network in its current state and receives the response of each node to this input (step 420). The system executes a backward propagation process (step 430). The system repeats steps 410-430 until the maximum number of iterations are reached or until the neural network is giving sufficiently correct responses on the training set (step 440). What constitutes sufficiently correct can be arbitrarily defined and is usually dependent on the task at hand. In one implementation, the system stops the iteration when the neural network produces incorrect outputs on only 3% or less of the inputs from the training set or when 120,000 iterations have been performed, whichever occurs first.

A node of the neural network typically includes various internal parameters that are used in its computation. These internal parameters can usually be adjusted in a training process so as to move the neural network towards producing correct responses. One set of internal parameters, for example, are the weights that a node gives to each of its inputs from nodes in the preceding layer. The weights are typically scaling factors that are multiplied by the incoming inputs before further processing.

A backward propagation process can adjust the internal parameters of nodes when given (1) an input to the neural net; (2) the actual response of each node in the neural net to that input; and (3) the desired output of the neural net. The backward propagation process usually needs to be applied iteratively many times to the neural net, for example, from 1,000 to 1,000,000 times.

The backward propagation process is usually applied to the nodes in the reverse order of the order in which the nodes evaluate an input. The system first applies the backward propagation process to an output node, for example, one in a last layer L, followed by applying the process to the nodes that feed to the output node, for example, ones in layer L-1, and so forth until the system gets to the nodes in the first layer of the neural network.

Figure 5:
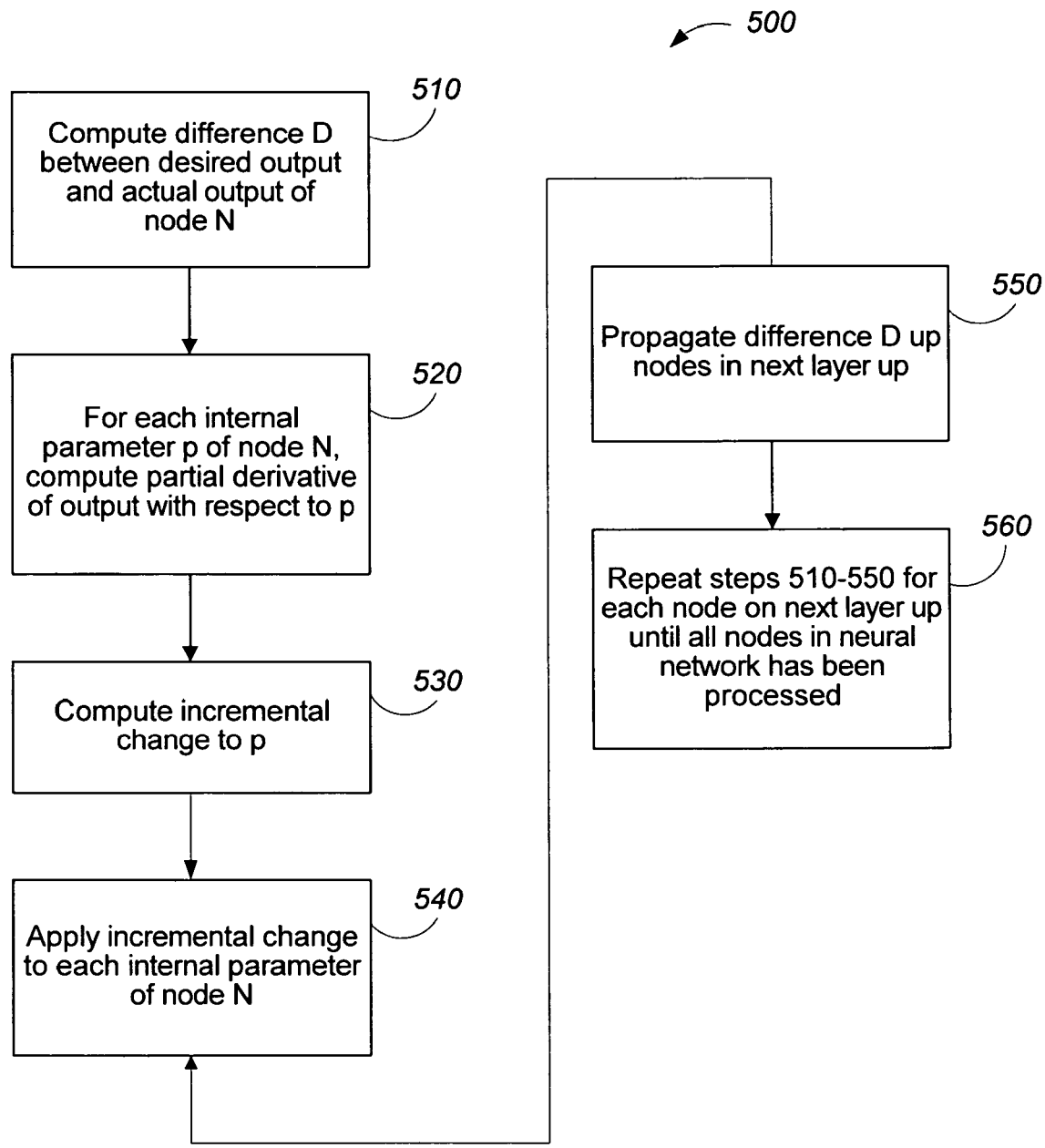
FIG. 5 shows a backward propagation process 500.

FIG. 5 shows an example of the backward propagation process 500 starting from an output node N. The backward propagation process 500 can be included in step 430 of the training method 400. It is assumed that the output of each node has already been computed and stored with each node.

The system computes a variable D, which is the difference between the desired output and the actual output of the node N (step 510). In one implementation:

$$D=<\text{desired output}>-<\text{actual output}>$$

For each internal parameter p of the node N, the system computes the partial derivative of the output with respect to p, with the other variables set by the current inputs to the node (step 520). If the output is referred to as X, then this partial derivative is dX/dp. The system computes an incremental change top (step 530). In one implementation, the incremental change is computed as:

$$\text{inc}(p)=\text{ga}\cdot(dX/dp)\cdot D$$

Here, ga is a gain parameter. The gain ga is the same for all nodes and determines the rate of convergence of the training process. The gain is typically initially set at 0.1. If set too high, the training might not converge. If set too low, the training may require additional iterations to converge.

The system then applies the computed incremental change to each internal parameter of the node (step 540). The system propagates the difference D up the nodes in the next layer up (step 550). If the difference for node M is designated as D(M), then:

$$D(M)=D(N)\cdot(dX/dM)$$

Here, D(N) is the difference D computed for the output node N, and dX/dM is the partial derivative of the output of node N with respect to the input from node M. Once the system has performed the described computation steps, the system has the difference values for each of the nodes on layer L-1. The system can then repeat steps 510-550 for each node on the next layer above layer L until all nodes in the neural network have been processed (step 560). For example, the system can repeat steps 510-550 for each node on layer L-1. In doing so, the system can compute the difference values for nodes on layer L-2, and thus can process those L-2 nodes next. The system continues this process until all the nodes up to but not including nodes on layer 1 have been processed. Note that there are no restrictions on the computation that a node may perform, as long a partial derivatives can be computed.

In implementations where the neural network has for layers and includes gating nodes, such as the implementation shown in FIG. 3, the system can consider both the gating nodes and the hidden nodes to be nodes on layer 2. As discussed above, when there are gating nodes, the neural network includes multiplication nodes, which multiply two inputs (one from the corresponding hidden node and one from the corresponding gating node) to produce an output. The neural network can consider the multiplication nodes as nodes on a third layer. The output of the multiplication nodes are feed into the output node, which is on layer 4.

The system uses the neural network to classify the pixels of the third region as either located in the first region or located in the second region (step 250 of FIG. 2). The system provides input information to the neural network. The input information specifies a color arrangement of a learning-machine input set of pixels as well as the location of a pixel of interest. The neural network takes the input information and produces an output that specifies a probability that the pixel of interest is located in the first region and a probability that the pixel of interest is located in the second region. The output can be a floating point number between a first number and a second number, for example, −1 and 1.

The system maps the classification provided by the neural network and generate a probability mask (step 260). Mapping can include offsetting and scaling. Given an output that is a number between −1 and 1, for example, the system can offset the number by adding 1 to the number. The system scales the result of the offset by 127.5 to produce a number between 0 and 255. The system generates a probability mask by assigning the mapped output of the neural network to corresponding pixels of the mask.

The system defines one or more boundary masks from the probability mask (step 270). One boundary mask can be an opacity mask that identifies pixels that do not satisfy a threshold probability of being located in either the first or the second regions. Pixels having probability values between ⅓·255 and ⅔·255, for example, can be identified. A second boundary mask can be an opacity mask that that identifies pixels that can be classified as located in the second region, for example, pixels having probability values between 0 and ⅓·255, inclusive. A third boundary mask can be an opacity mask that that identifies pixels that can be classified as located in the first region, for example, pixels having probability values between ⅔·255 and 255, inclusive.

The system decontaminates pixels of the third region and sharpen the boundary between the first and second regions (step 280). The following describes one implementation of this decontamination procedure.

Inputs to a decontamination process include: (1) a color image, usually defined by a group of pixels to be decontaminated; and (2) a classification of pixels in the color image into the foreground, background and boundary. The pixels being decontaminated can but need not be a 2-dimensional grid of pixels, where each pixel has an (x, y) coordinate specifying its location. The classification can be provided by the one or more boundary masks defined in step 270.

Outputs of the decontamination process include: (1) a modified color image; and (2) an opacity mask. The opacity mask can be an image with the same dimension as the color image, but instead of having a color value stored at each location, there is a single scalar value that is interpreted as the opacity of the corresponding pixel in the color image. If an opacity value is at the maximum possible, 255 for the case here, then the corresponding color pixel is considered to be totally opaque. If the opacity value is at the minimum possible, 0 for the case here, then the corresponding color pixel is to be considered totally transparent. Intermediate values correspond to intermediate opacity.

Figure 6:
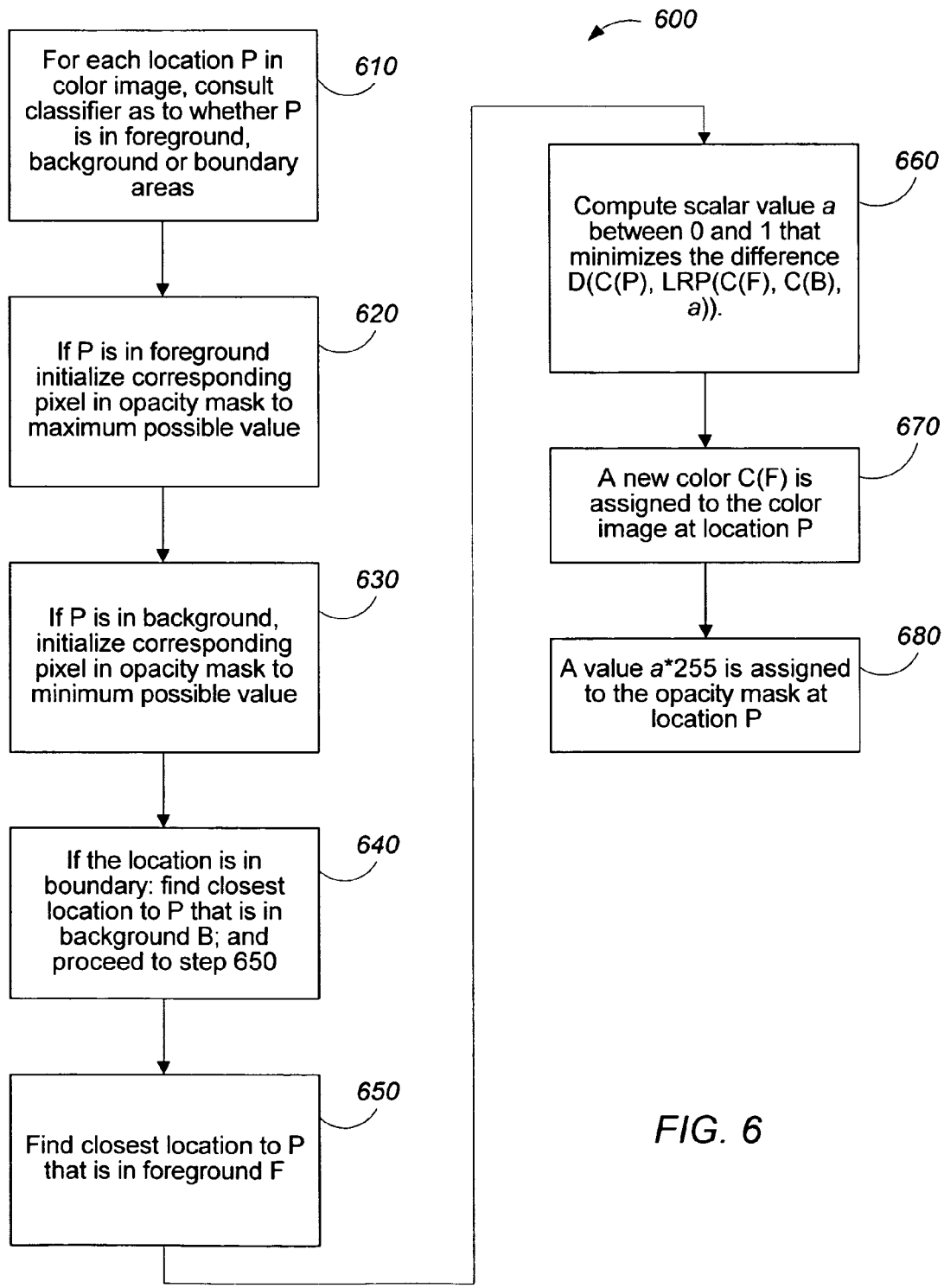
FIG. 6 shows a method 600 for decontamination.

FIG. 6 shows an example decontamination process 600, which can be included in step 280 (FIG. 2). For each location P in the color image, consult the classification as to whether P is in the foreground, background or boundary (step 610). If P is in the foreground, initialize the corresponding pixel in the opacity mask to the maximum possible value, for example, 255 (step 620). If P is in the background, initialize the corresponding pixel in the opacity mask to the minimum possible value, for example, 0 (step 630). If the location is in the boundary, then perform the following steps: (1) Find the closest location to P that is in the background and call this location B (step 640). (2) Find the closest location to P that is in the foreground and call this location F (step 650).

During the decontamination process, the system may perform color computations, including the color computations described below. We will use C(X) to denote the color at location X. Typically C(X) can include 1 to 4 numbers, these numbers being the values of the various color channels for that color. For example, a typical color would consist of three channels {r, g, b} giving the intensity of the red, green and blue components respectively. In the examples below, it is assumed that colors consist of these three {r, g, b} channels.

The process can be generalized to colors that have any number of components. One operation the system may need to perform is to measure the difference between two colors C1={r1, g1, b1} and C2, ={r2, g2, b2}. This difference can be computed as $(r1 - r2)^2 + (g1 - g2)^2 + (b1 - b2)^2$, which is denoted as D(C1, C2). Another operation the system may need to perform is to linearly interpolate two colors C1 and C2 using an interpolation constant a. The color interpolation operation is an one that returns a third color C3={r3, g3, b3} from the following inputs:

$$r3 = a \cdot r1 + (1-a) \cdot r2$$

$$g3 = a \cdot g1 + (1-a) \cdot g2$$

$$b3 = a \cdot b1 + (1-a) \cdot b2.$$

The resulting color is denoted as LRP(C1, C2, a).

The system can compute a scalar value a between 0 and 1 (step 660 of FIG. 6) that minimizes the difference D(C(P), LRP(C(F), C(B), a)).

The above described computation can be carried out directly by considering colors to be points in a vector space (using color channel values as vector space coordinates) and finding the point on the line in this color vector space from C(B) to C(F) that is closest to C(P). This process can be described in terms of analytic geometry as follows:

(i) Project C(P) perpendicularly onto the infinite line through C(F) and C(B) and call the projected point (color) K.

(ii) If K lies between the end points of the line segment from C(F) to C(B), then a is the ratio of the Euclidian distance from K to C(B) to the Euclidian distance from C(F) to C(B).

(iii) If K lies outside this line segment on the side of C(F), then a is 1. If K lies outside the segment closer to C(B), then a is 0.

Note that the Euclidian distance is the same as the square root of the difference D.

Once the computation of steps 640, 650, and 660 have been completed, the system can finish the decontamination computation for the location P as follows:

A new color C(F) is assigned to the color image at location P (step 670). A value a·255 is assigned to the opacity mask at location P (step 680). a is multiplied by 255 because, in the described implementation, the range of possible values in mask ranges from 0 to 255. A decontamination process similar to the one described above is described in commonly assigned U.S. Pat. No. 6,721,446, filed on Apr. 26, 1999 and entitled "Identifying Intrinsic Pixel Colors in a Region of Uncertain Pixels", which is hereby incorporated by reference.

The described decontamination method can be improved. A copy of the original color image can be made. In the copy, the colors in the foreground and background locations are smoothed. For each location P in the foreground, the system can replace the color C(P) with an average of all colors within a certain fixed distance of P that also are in the foreground. This average may be a weighted average where the weight is greater for locations closer to P. A Gaussian function, for example, may be used to determine the weighted average. The system can perform similar operations for each location P in the background. C(B) is replaced with a weighted average of colors that are within a certain distance to P and also in the background. The maximum average distance used above can be in the range from 2 to 100, but is typically about 20 pixels. The resulting image copy is a smoothed version of the original image.

The above described decontamination method can then be modified. When decontaminating a location in the boundary, the system can find the locations F and B as described above. However, when computing a, the system can take C(F) and C(B) from the smoothed copy, and not from the original image. The resultant color C(F) is still stored back in the original color image.

The system multiplies the mask produced from decontamination with the probability mask generated in step 260 (step 290 of FIG. 2). This product produces a mask that, when applied to the modified image of the decontamination method, produces an isolated version of the first region. The system can repeat steps 220-290 to segment other regions as appropriate to extract the object of interest. Once extracted, the system can receive user inputs and modify the object in accordance with those user inputs. Alternatively, the system can multiply the probability mask with the mask produced from decontamination.

Figure 7A:
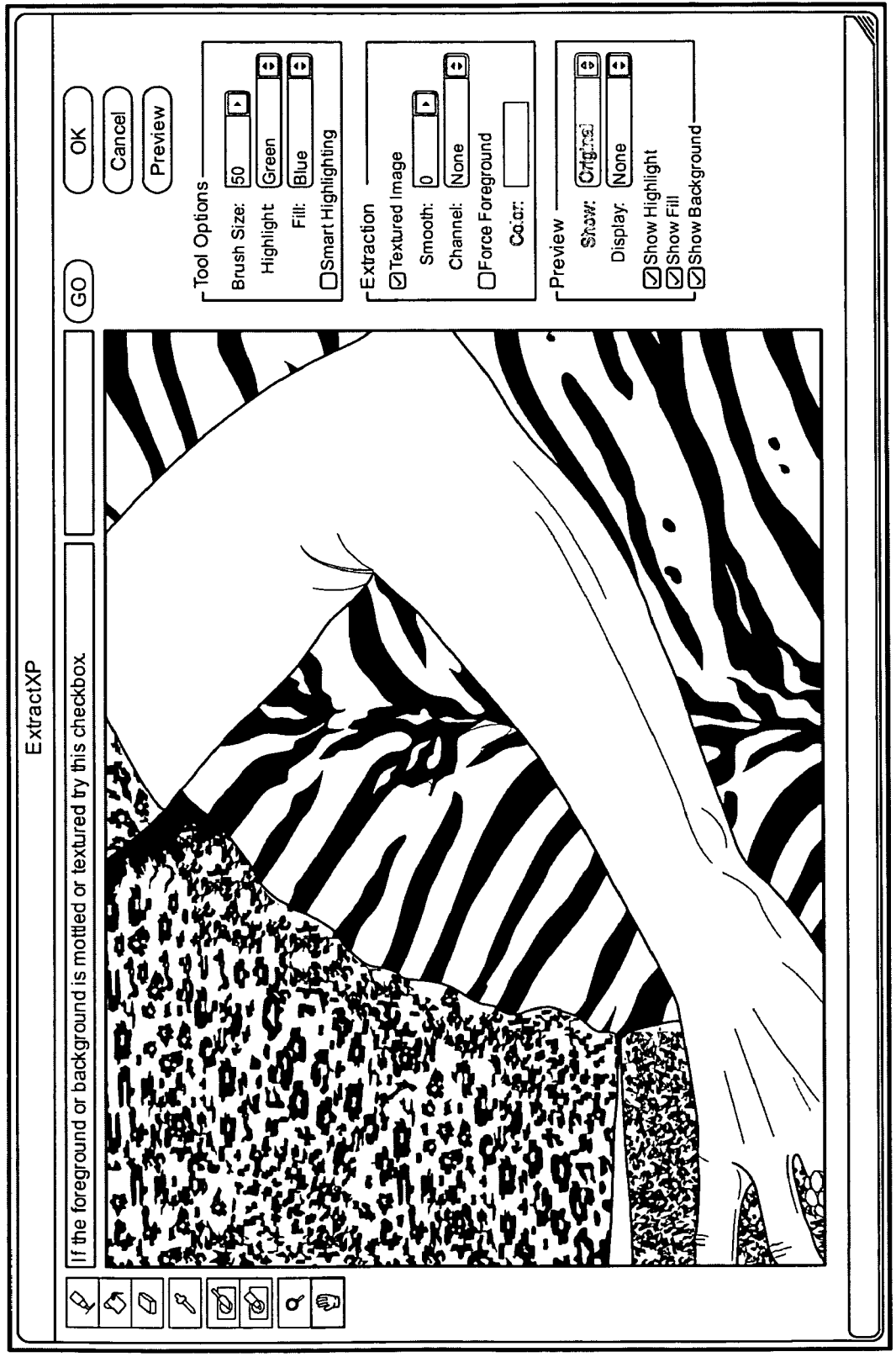
FIGS. 7A-7E illustrate an example of the object extraction process of the invention.
Figure 7B:
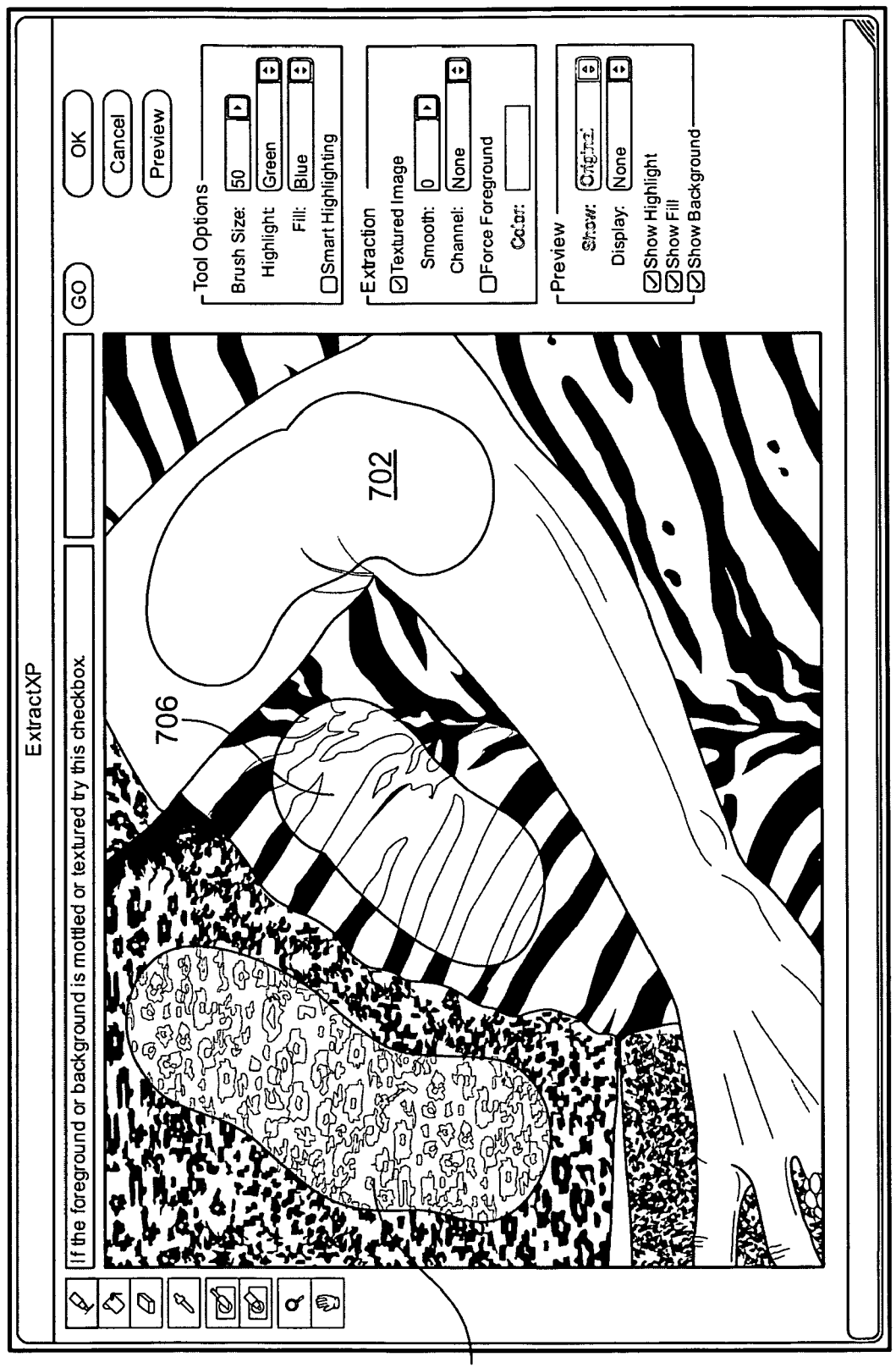
Figure 7C:
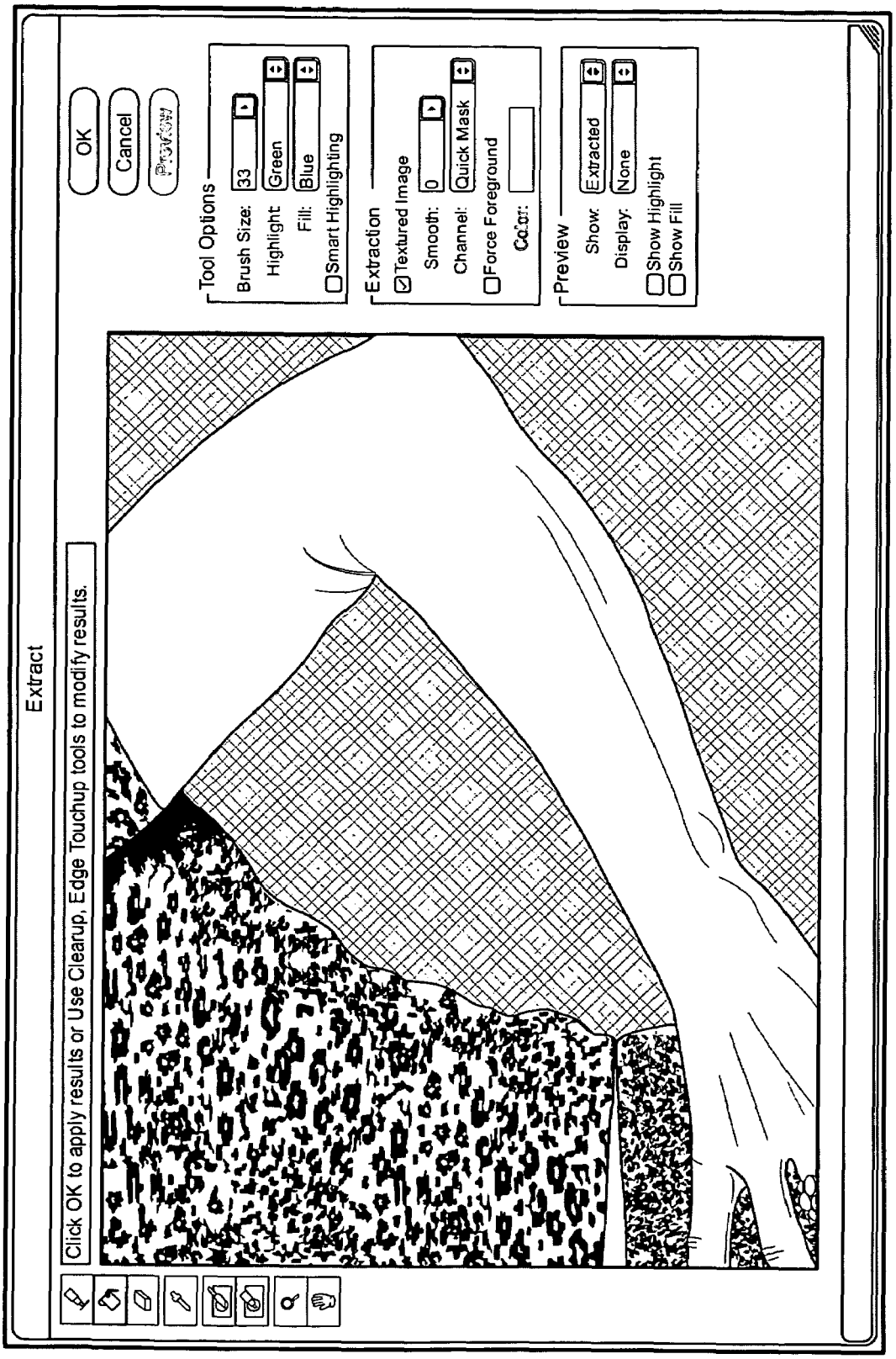

FIGS. 7A and 7B illustrate an example of an extraction process performed as described above. FIG. 7A shows a color image of a person against a background. A user wishes to extract the person from the background using the system described above. As shown in FIG. 7B, the user provides samples of color arrangements of the foreground using a blue highlight brush to highlight sample regions 702 and 704. There are two foreground color arrangements, one exhibited by the leopard pattern of the person's clothes and a second exhibited by the person's skin. The user provides samples of a color arrangement of the background by using a red highlight brush to highlight a sample region 706. The color arrangement of the background is exhibited by the zebra pattern shown. The system then locates the boundary between the foreground and background and extracts the foreground. FIG. 7C shows the result of the extraction.

Figure 7D:
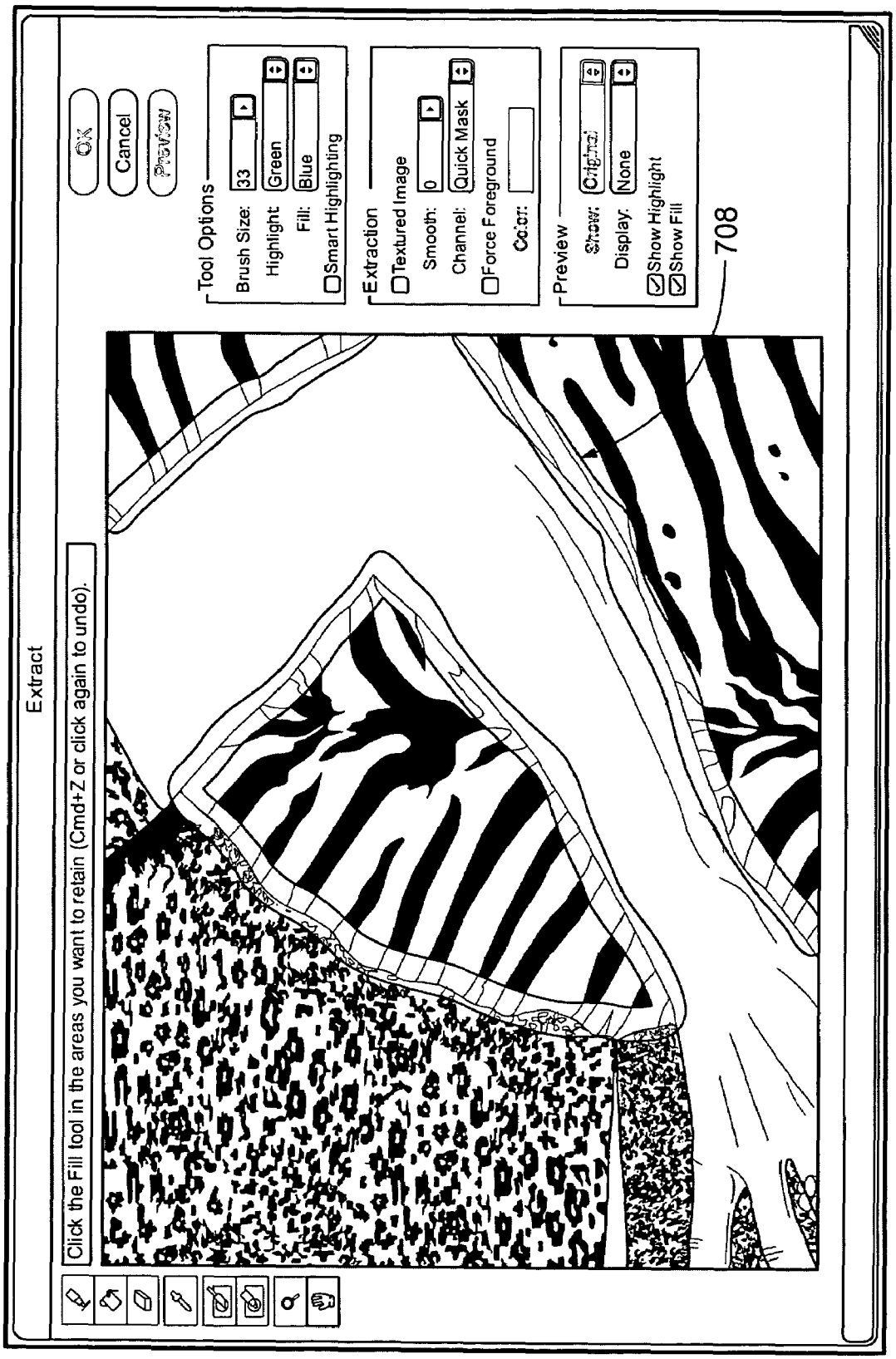
Figure 7E:
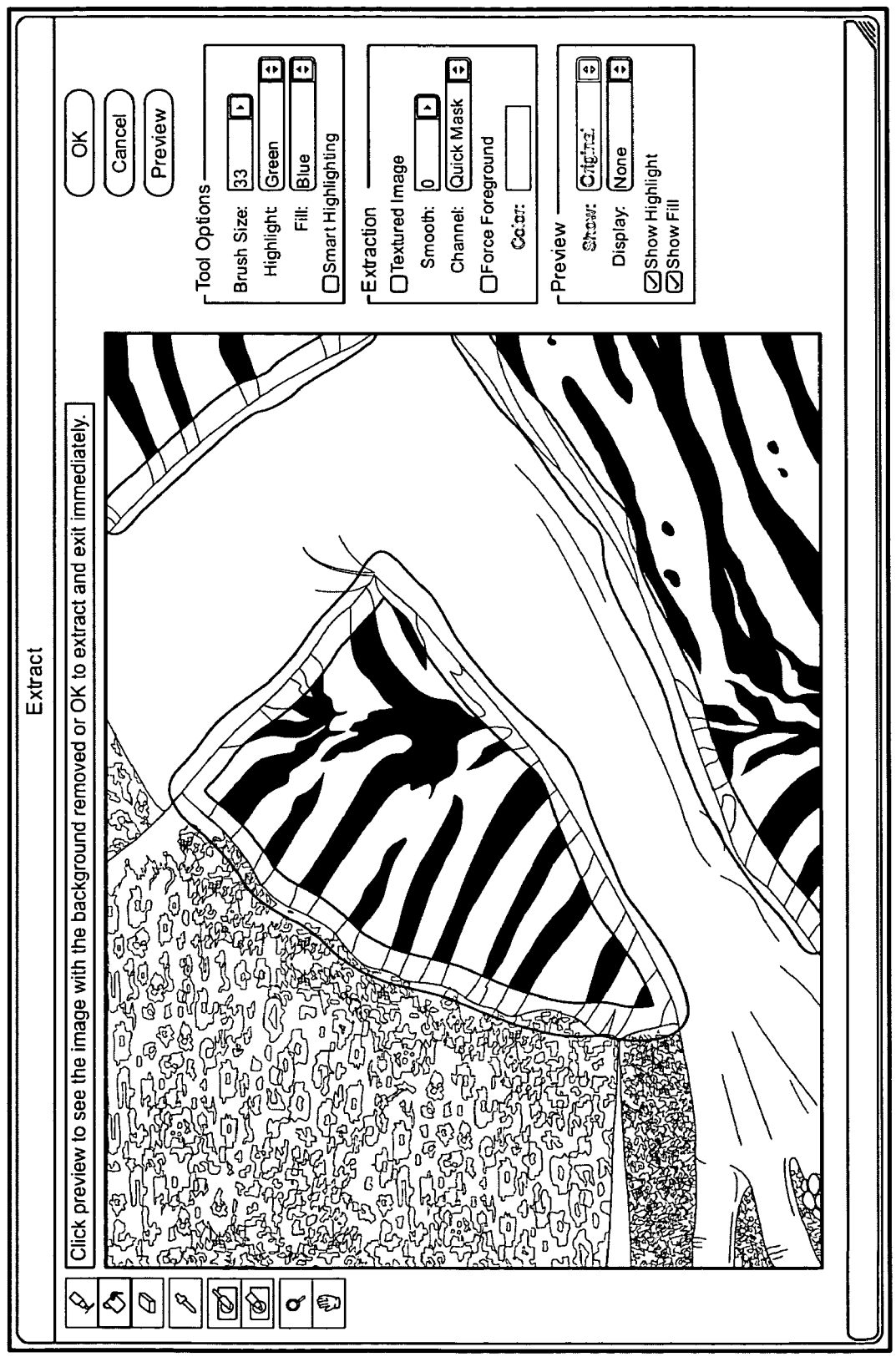

FIGS. 7D and 7E shows an alternative extraction process given the same input color image (i.e., the one shown in FIG. 7A). As shown in FIG. 7D, the user can coarsely indicate the boundary between regions to be separated by using a green highlight brush to highlight a region 708 that includes the boundary. Then, the user clicks on one side of the boundary, indicating that the side clicked on is the foreground. As shown in FIG. 7E, the side clicked on is flood filled with a blue highlight. The result of the extraction process is shown in FIG. 7C.

Figure 8:
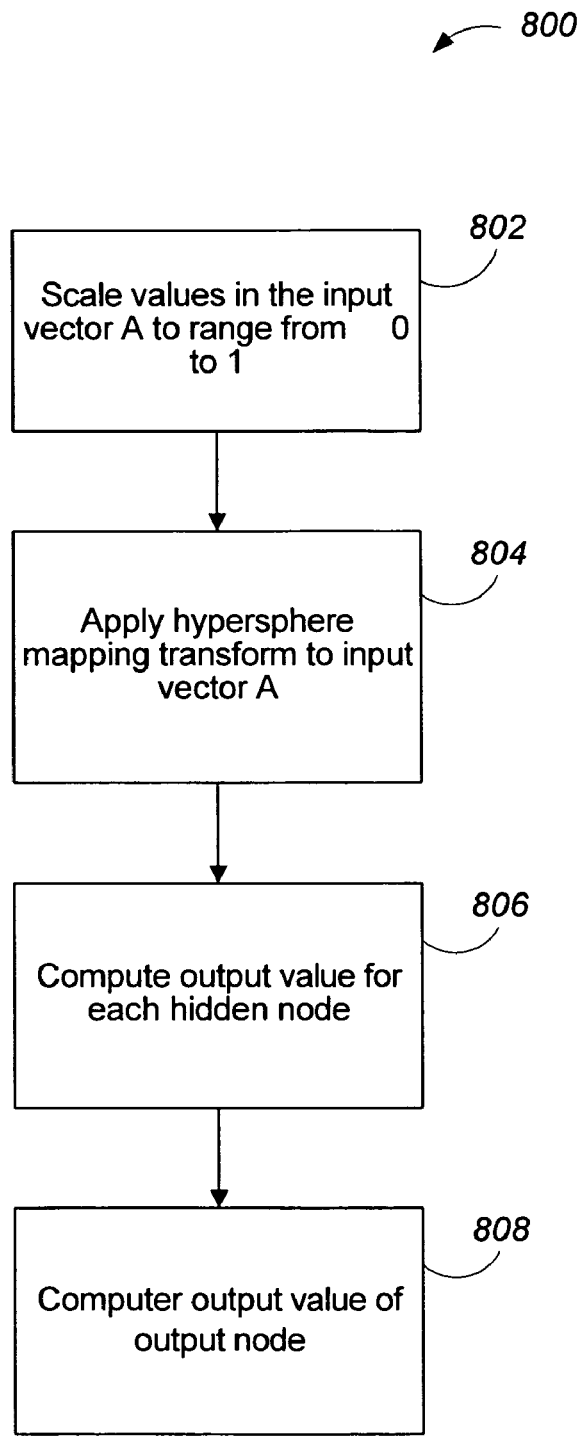
FIG. 8 shows a neural network computation process 800.
Figure 9:
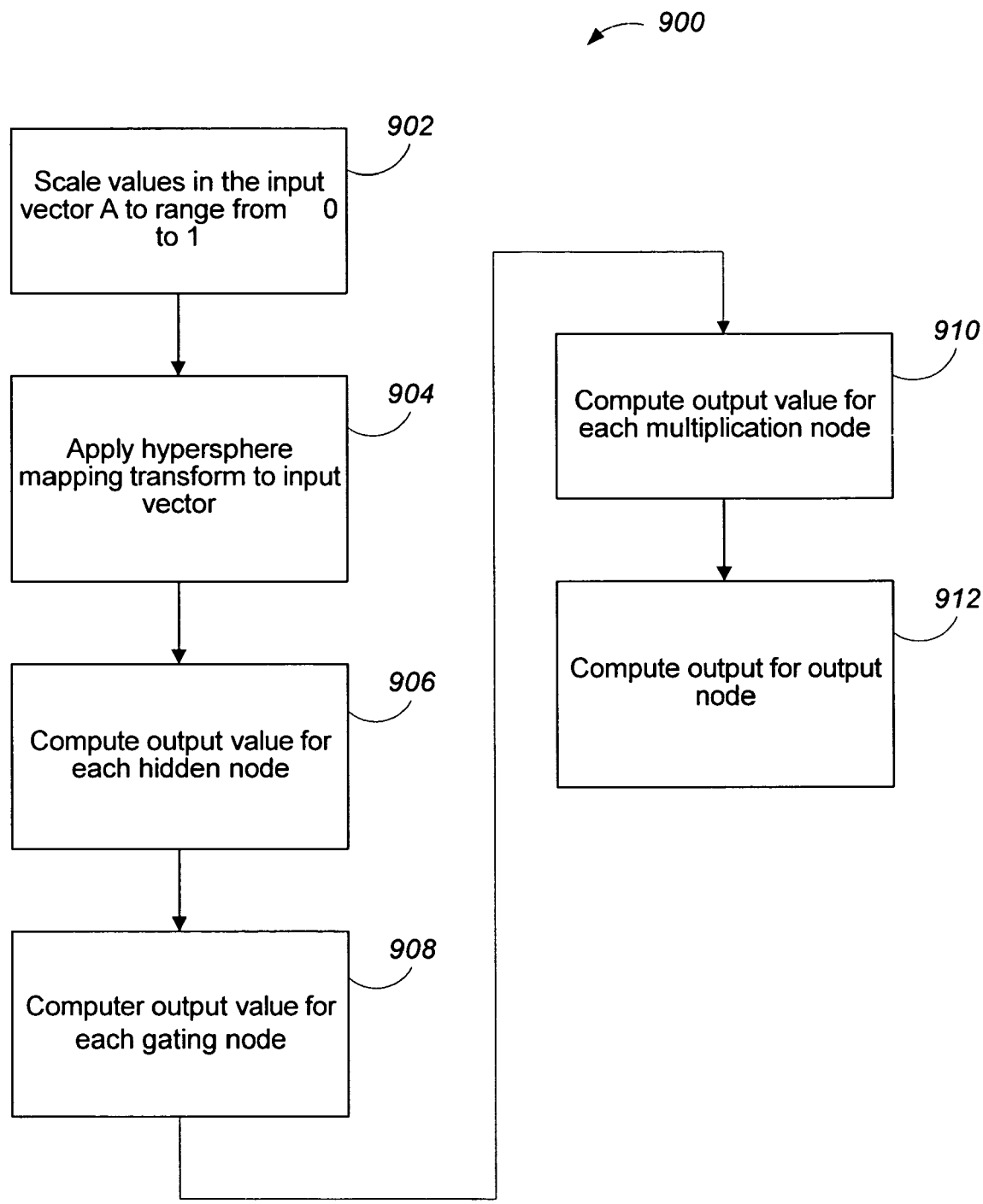
FIG. 9 shows another neural network computation process 900.

FIGS. 8 and 9 shows examples of computation processes that produce an output of the neural network. The learning-machine input set of pixels is an s-by-s arrangement of pixels, where s is an odd number. The pixels in the image are assumed to be in the RGB color space, and thus each pixel includes three color values. R(x,y) denotes the value of the red component of the image at the location (x,y). Likewise, G(x,y) and B(x,y) denotes the green color component and the blue color component, respectively. If the image has more or fewer color components, then step 1 below can be modified to add or remove values from the input vector.

FIG. 8 shows a first computation process 800 that is used when the neural network does not include gating nodes. The first computation process 800 includes four steps. The inputs to the neural network for a pixel at location (u,v) are:

R(x,y), G(x,y), and B(x,y) for x=u−(s−1)/2 to x=u+(s−1)/2 and for y=v−(s−1)/2 to y=v+(s−1)/2. These $3 \cdot s^2$ numbers are collected into an input vector denoted as A. The order in which the $3 \cdot s^2$ numbers appear in the input vector is immaterial. However, once established, the order should be maintained for subsequent computation processes.

The values in the input vector A are scaled to the range from 0 to 1 (step 802). In one implementation, values taken directly from the image are in the range from 0 to 255, so the scaling step multiplies each value in A by 1.0/255.0. That is, $$A(j)=(1/255) \cdot A(j), \text{ for } j=1 \text{ to } 3 \cdot s^2$$

A hypersphere mapping transform is applied to the input vector A (step 804). The transform can be implemented as a subroutine that can be applied to any vector V of length m (because the system will need to use the transform differently below).

The hypersphere mapping transform is performed as follows. Extend the vector V to include one more element at the end, and give this added element a value of 1.0. Then, compute the Euclidian length of this newly augmented vector, according to the formula:

$$L=Sqrt(\Sigma(V(j)^2, j=1, m+1)).$$

Then, scale all the elements of the vector V by the reciprocal of the length:

$$V(j)=(1/L) \cdot V(j), \text{ for } j=1 \text{ to } m+1$$

As a result of applying the hypersphere mapping step to the vector A. Vector A now has a length of $3 \cdot s^2+1$.

Compute the output value for each hidden node (step 806). Because all hidden nodes are identical except for the state of their internal parameters, only the computation of a typical hidden node is described. The hidden nodes are numbered from 1 to H, where H is the total number of hidden nodes. Given hidden node number k. The hidden node k has $3 \cdot s^2+1$ internal parameters (corresponding to the inputs) contained in the vector $W_k$, plus one more internal parameter, $b_k$. The output of the node number k is:

$$Q(k)=\text{Tan } h(\Sigma(W_k(j) \cdot A(j), j=1, 3 \cdot s^2+1)+b_k)$$

Where Tan h is the hyperbolic tangent function and Q is a vector representing the outputs of all the hidden nodes.

Compute the output of the output node (step 808). The output node is similar to hidden node, except that it takes its inputs from each hidden node. Thus, the final computation is:

$$R=\text{Tan } h(\Sigma(W_0(j) \cdot Q(j), j=1, H)+b_0)$$

Where $W_0$ and $b_0$ are the internal parameters for the output node and R is the final output.

FIG. 9 shows second computation process 900 that is used when the neural network includes gating nodes. The second computation 900 process includes six steps.

The values in the input vector A are scaled to the range of 0 to 1 (step 902). Step 902 is similar to step 802 except that step 902 is modified by adding to the input vector two new values that specify the location of the pixel under consideration. These values are computed as:

$$Sx=x/\text{Max}X$$

$$Sy=y/\text{Max}Y$$

Where Sx and Sy are the two new location components and MaxX is the maximum x coordinate of any pixel in the image and MaxY is the maximum y coordinate of any pixel in the input image. This computation scales the pixel coordinates to the range of 0 to 1. It is important for subsequent steps that Sx and Sy be added to the end of the input vector.

A hypersphere mapping transform is applied to the input vector A (step 904). Step 904 is similar to step 804 except for the following. The input vector A is broken up into two vectors, one denoted B consisting of $s^2$ color values and the second denoted C consisting of 2 location values. Then, the above described hypersphere mapping transform is applied to each of B and C, separately producing new vectors of length $s^2+1$ and 3, respectively.

Compute the output value for each hidden node (step 906). Step 906 is similar to step 806 except that the inputs come from the B vector, rather than the A vector. The output value is defined as:

$$Q(k)=\text{Tan } h(\Sigma(W_k(j) \cdot B(j), j=1, 3 \cdot s^2+1)+b_k)$$

Compute outputs of the gating nodes (step 908). The gating nodes are similar to the hidden nodes except that the internal W parameter is of length 3. A subscript of k+H is used for W and b in the gating nodes to distinguish then from the internal parameters of the $k^{th}$ hidden node. Additionally, the gating nodes take their input from the C vector. We will call the output of the $k^{th}$ gating node S(k). The computation for an output of a gating node is:

$$S(k)=\text{Tan } h(\Sigma(W_{k+H}(j) \cdot C(j), j=1, 3)+b_{k+H})$$

Compute outputs of multiplication nodes (step 910). There is one multiplication node for each hidden/gating node pair. If we denote the output of the $k^{th}$ multiplication node as T(k), then:

$$T(k)=Q(k) \cdot S(k)$$

Compute the output of the output node (step 912). Step 912 is similar to step 808. The only difference is that the output node takes its input from the multiplication nodes:

$$R=\text{Tan } h(\Sigma(W_0(j) \cdot T(j), j=1, H)+b_0)$$

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array), an ASIC (application-specific integrated circuit), or a graphics processing unit.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, the steps of the invention can be performed in a different order and still achieve desirable results.

The invention claimed is:

1. A method for defining a boundary separating a first region and a second region of a digital image, the digital image including one or more color arrangements characteristic of a first visual texture of the first region and one or more color arrangements characteristic of a second visual texture of the second region, the method comprising;
   selecting, via a user input, a training set of pixels including a portion of the first region, a portion of the second region, and the boundary, the training set of pixels exhibiting sample color arrangements associated with both the first and second visual textures;
   training a learning machine to classify learning machine input sets based upon the training set, each learning machine input set including a pixel of interest and neighboring pixels;
   determining using the trained learning machine which pixels of the digital image satisfy criteria for classification as being associated with the first region and second region, by inputting the learning machine input sets each including the respective pixel of interest and the respective neighboring pixels, and outputting an indication of a region to which each of the pixels of interest belong;
   identifying pixels of the digital image that are determined not to satisfy the criteria for classification as being associated either with the first region or the second region; and
   decontaminating the identified pixels to define the boundary between the first and second regions by separating pixels of the digital image into pixels associated with the first region, the second region, or the boundary.

2. The method of claim 1, wherein the learning machine is a support vector machine.

3. The method of claim 1, wherein the learning machine, is a neural network.

4. The method of claim 1, wherein the indication represents a probability of the pixel of interest being associated with the first region and a probability of the pixel of interest being associated with the second region.

5. The method of claim 4, wherein the indication is a floating point number between a lower number and an upper number, the lower number indicating a one-hundred percent probability of the pixel of interest being associated with the second region, and the upper number indicating a one-hundred percent probability of the pixel of interest being associated with the first region.

6. The method of claim 5, wherein:
   the lower number is −1 and the upper number is 1.

7. The method of claim 5, further comprising:
   converting the floating point number to an integer between a first integer and a second integer, the first integer indicating a one-hundred percent probability of the pixel of interest being associated with the second region, and the second integer indicating a one-hundred percent probability of the pixel of interest being associated with the first region.

8. The method of claim 7, wherein:
   the first integer is 0 and the second integer is 255.

9. The method of claim 7, wherein:
   the criteria for classification as associated with the first region includes having an integer that exceeds a first threshold; and
   the criteria for classification as associated with the second region includes having an integer that is less than a second threshold.

10. The method of claim 9, wherein:
    the first threshold is 170 and the second threshold is 85.

11. The method of claim 1, wherein the training set of pixels includes pixels located within a particular range of the boundary.

12. The method of claim 11, wherein:
    the particular range is 20 pixels from either side of the boundary.

13. The method of claim 1, wherein:
    the neighboring pixels represent one of a three-by-three square of pixels, a five-by-five square of pixels, and a seven-by-seven square of pixels.

14. The method of claim 13, wherein:
    the pixel of interest is located at a center of the neighborhood of pixels.

15. The method of claim 1, wherein:
    the learning machine is a neural network;
    the neural network includes hidden nodes and gating nodes; and
    a gating node is associated with a corresponding hidden node, the gating node being configured to determine based on a location of the pixel of interest, a contribution the corresponding hidden node makes to an output of the neural network.

16. The method of claim 1, further comprising:
constructing from the identified pixels a boundary mask that indicates which pixels of the digital image are the identified pixels.

17. The method of claim 1, wherein decontaminating produces an opacity mask, the method further comprising;
constructing from the identified pixels a probability mask; and
combining the opacity mask and the probability mask.

18. The method of claim 17, wherein:
combining the opacity mask and the probability mask includes multiplying the opacity mask with the probability mask.

19. The method of claim 1, wherein the first region is a foreground of the digital image and the second region is a background of the digital image, and decontaminating includes:
excluding from the identified pixels a pixel that has no foreground colors; and
changing colors of a pixel that includes both foreground and background colors so that the changed identified pixels include only foreground colors.

20. A method for defining a boundary separating a first region and a second region of a digital image, the digital image including one or more color arrangements characteristic of a first visual texture of the first region and one or more color arrangements characteristic of a second visual texture of the second region, the method comprising:
selecting, via a user input, a training set of pixels including a portion of the first region, a portion of the second region, and the boundary, the training set of pixels exhibiting sample color arrangements associated with both the first and second visual textures;
training a neural network to classify learning machine input sets based upon the training set, using backward propagation, each learning machine input set including a pixel of interest and neighboring pixels; and
determining based on an output of a neural network which pixels of the digital image satisfy criteria for classification as associated with the first region and the second region, by inputting the learning machine input sets each including the respective pixel of interest and the respective neighboring pixels, and a location of the pixel of interest and outputting an indication of a region to which each of the pixels of interest belong;
wherein the neural network includes a gating node associated with a corresponding hidden node, the gating node being configured to determine, based on a location of the pixel of interest, a contribution the corresponding hidden node makes to the output of the neural network.

21. The method of claim 20, wherein the neighboring pixels represent one of a three-by-three square of pixels, a five-by-five square of pixels, and a seven-by-seven square of pixels, the pixel of interest being, located at a center of the square of pixels.

22. The method of claim 20, further comprising;
training the gating node to determine, based on the location of the pixel of interest, a contribution the hidden node makes to the output of the neural network.

23. The method of claim 22, further comprising;
training the hidden nodes to classify pixels of the digital image as either associated with the first region or associated with the second region, wherein the training of the hidden nodes occurs during the training of the gating nodes.

24. The method of claim 20, further comprising;
receiving input information specifying the location of the pixel being considered via input nodes; and
providing the input information to the gating node.

25. The method of claim 20, further comprising;
receiving input information specifying the color arrangement of the corresponding neighborhood of pixels via input nodes; and
providing the input information to the corresponding hidden node.

26. A computer program product, tangibly stored on a computer-readable medium, for segmenting a first region and a second region of a digital image, the digital image including one or more color arrangements characteristic of a first visual texture of the first region and one or more color arrangements characteristic of a second visual texture of the second region, the product comprising instructions operable to cause a processor to:
select, via a user input, a training set of pixels including a portion of the first region, a portion of the second and the boundary, the training set of pixels exhibiting sample color arrangements associated with both the first and second visual textures;
train a learning machine to classify learning machine input sets based upon the training set, each learning machine input set including a pixel of interest and neigh boring pixels;
determine using the trained learning machine which pixels of the digital image satisfy criteria for classification as being associated with the first region and the second region, by inputting the learning machine input sets each including the respective pixel of interest and the respective neighboring pixels, and outputting an indication of a region to which each of the pixels of interest belong;
identify pixels of the digital image that are determined not to satisfy the criteria for classification as being located either in the first region or the second region; and
decontaminate the identified pixels to define the boundary between the first and second regions by separating pixels of the digital image into pixels associated with the first region, the second region, or the boundary.

27. A computer program product, tangibly stored on a computer-readable medium, for segmenting a first region and a second region of a digital image, the digital image including one or more color arrangements characteristic of a first visual texture of the first region and one or more color arrangements characteristic of a second visual texture of the second region, the product comprising instructions operable to cause a processor to:
select, via a user input, a training set of pixels including a portion of the first region, a portion of the second region, and the boundary, the training set of pixels exhibiting sample color arrangements associated with both the first and second visual textures;

train a neural network to classify learning machine input sets based upon the training set, using backward propagation, each learning machine input set including a pixel of interest and neighboring pixels; and determine based upon an output of the neural network which pixels of the digital image satisfy criteria for classification as association with the first region and the second region by inputting the learning machine input sets each including the respective pixel of interest and the respective neighboring pixels, and a location of the pixel of interest and outputting an indication of a region to which each of the pixels of interest belong;

wherein the neural network includes a gating node associated with a corresponding hidden node, the gaining node being configured to determine, based on a location of the pixel of interest, a contribution the corresponding hidden node makes to the output of the neural network.

* * * * *